March 31, 1959 A. MASSEN 2,879,594
HIGH SPEED HANDPIECE
Filed May 2, 1956 2 Sheets-Sheet 1
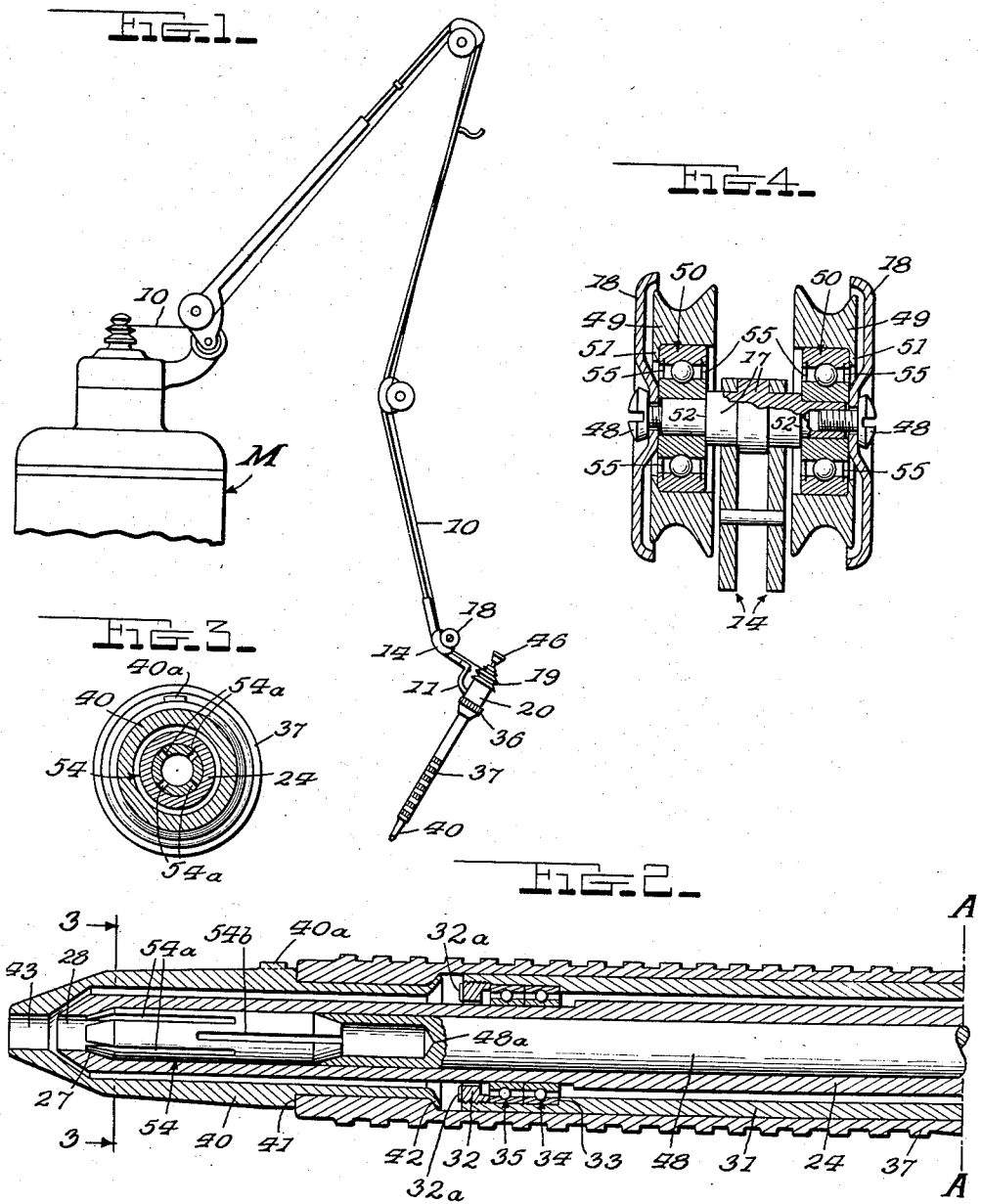
INVENTOR
Armand Massen
BY Mason, Porter, Diller & Stewart,
ATTORNEYS

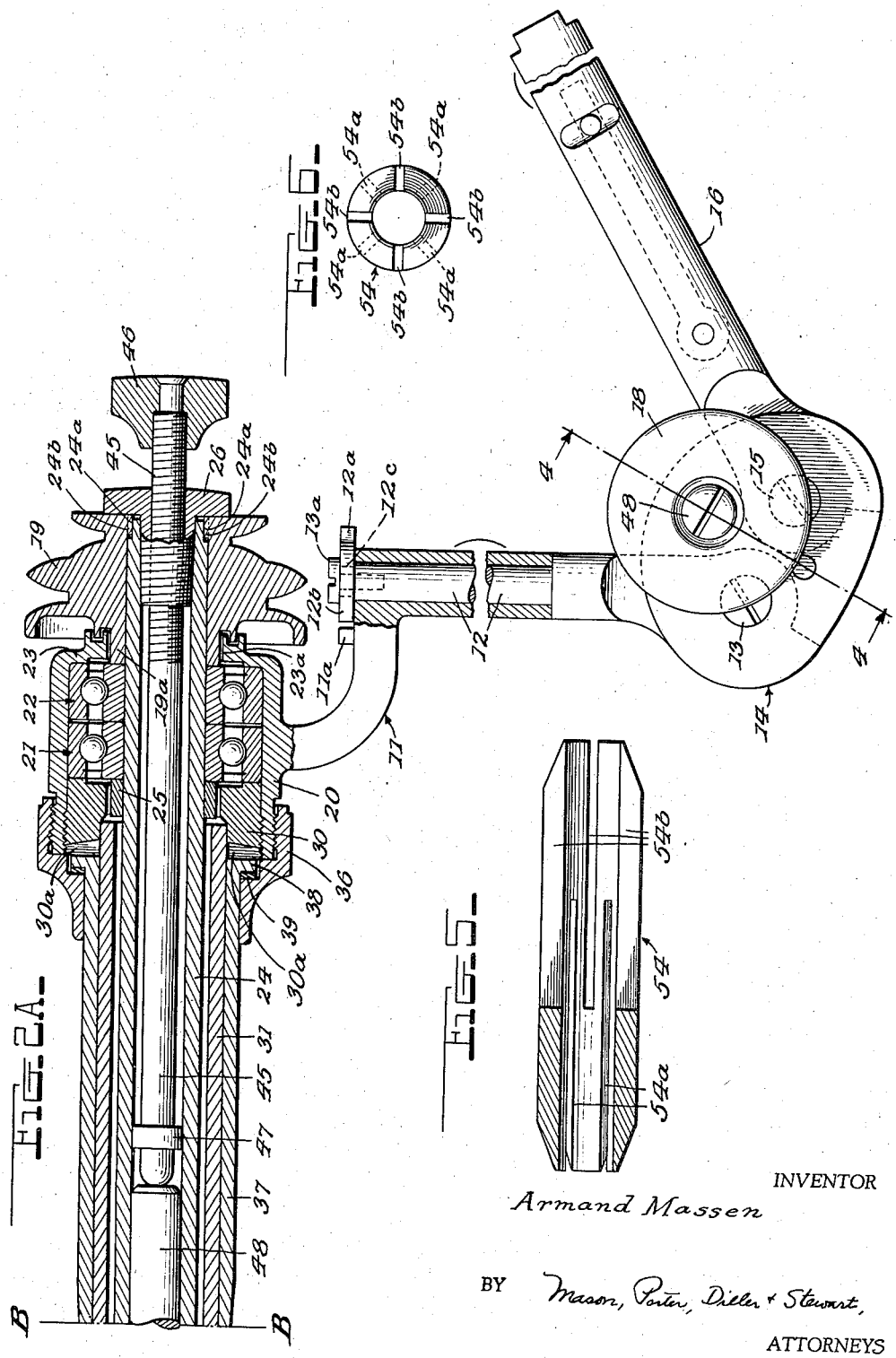

United States Patent Office 2,879,594
Patented Mar. 31, 1959

2,879,594

HIGH SPEED HANDPIECE

Armand Massen, Staten Island, N.Y., assignor to The S. S. White Dental Manufacturing Company, Philadelphia, Pa., a corporation of Pennsylvania Application May 2, 1956, Serial No. 582,199

6 Claims. (Cl. 32—26)

This invention relates to a handpiece capable of holding and rotating cutting devices such as dental burs and like tools and tool holders at high speed.

An object of the invention is to provide a handpiece which assures proper support against axial and radial forces, which is of small diameter and free from encumbering projections adjacent the tool-receiving end, and which allows wide freedom of movement in various directions.

Another object is the provision of a handpiece having antifriction bearing supports for a central rotating spindle, together with a sheath assembly including parts for holding the bearings in position.

A further object is the provision of a handpiece comprised of sub-assemblies which may be dismounted, cleaned and reassembled without demanding extreme accuracy of adjustment for assuring smooth and efficient operation.

With these and other objects in view, as will appear in the course of the following description and claims, an illustrative form of practice is shown on the accompanying drawing, showing a structure for supporting angle type and other handpieces and other instruments commonly used by the dental profession, in which:

Figure 1 shows a handpiece according to the invention shown conventionally connected to a driving motor;

Figures 2 and 2A jointly show a longitudinal axial section through the handpiece, with associated parts in elevation, the figures combining when the lines A—A and B—B are superimposed;

Figure 3 is a transverse section substantially on line 3—3 of Figure 2;

Figure 4 is a transverse section, substantially on line 4—4 of Figure 2A, of the wrist joint pulley assembly;

Figures 5 and 6 are respectively a longitudinal axial section and an end view of a chuck.

In the drawings, a handpiece according to the invention is shown for connection to a driving motor M by a belt 10 in the usual fashion for a dental drill. A wrist joint frame body 11 receives the pivot stem 12 which is connected by a pivot screw 13 to the wrist joint hinge frame 14, and the latter in turn by a pivot screw 15 to the link arm 16. The end of the pivot stem has a squared portion 12c for receiving a collar 12b which is fixed thereon by a screw 13a so that the collar turns with the pivot stem in one direction or the other until a projection or dog 12a on the collar engages the fixed lug 11a on the frame body 11. The wrist joint frame assembly 14 has a transverse shaft 17 upon which are mounted the wrist joint pulleys 49 for guiding the belt 10 toward and from the handpiece pulley 19, shown as having two steps. Such structures are in general known and are not specifically claimed herein. In the illustrated structure, Figs. 2 and 4, the wrist joint pulleys 49 each have an enlarged bore ending at a shoulder 51 for tightly receiving the outer race of a ball bearing 50 so that the bearing race acts as an integral part of the pulley. The inner races of these ball bearings are accurate sliding fits on the reduced ends of the transverses shaft 17 and against shoulders 52 thereof so that running clearance is provided between the wrist joint hinge frame 14 and the inward face of the respective pulley 49. The bearings are preferably provided with shields 55 at each side, for preventing loss of lubricant and for preventing entrance of foreign matter. At each end of shaft 17 is a pulley guard 18 which bears against the outer surface of the inner race of the corresponding bearing 50. Screws 48 are inserted through axial holes of the guards 18 and are threaded into the ends of shaft 17 for securely locating the guards 18 and also the inner races of the bearings.

For convenience of reference, the end of a handpiece bearing the pulley 19 will be called the rear end: and the end at which the bur or other tool is attached will be called the front end.

The frame body 11 has a hollow head 20 for receiving the rear ball bearing assemblies 21, 22, in axial abutment against one another and with abutment of the outer race of bearing 22 against the end wall 23 of the hollow head 20. A hollow spindle 24 has a press-fitted spindle collar 25 thereon which abuts against the inner race of the bearing 21. The spindle 24 is an accurately tight fit within the inner races of bearings 21, 22, and projects rearwardly through the pulley 19 which has an axial flange 19a at its front end, loosely received within an aperture 23a of the end wall 23. Labyrinthine grooves and ribs are provided on the head 20 and the pulley 19; and these two parts are closely fitted for preventing loss of lubricant and for preventing entrance of foreign matter. The spindle 24 has an internal thread at its rear end for receiving the stem of an internally and externally threaded chuck rod collet 26, so that upon tightening the collet 26 within the spindle the collet end face presses against the outer face of the pulley 19 and serves for tightly clamping the inner races of the bearings against the spindle collar 25. The spindle at the threaded end is provided with two slots for interengaging two projections provided in the bore of pulley 19 for positive driving means thereof. The front end of the spindle 24 is formed with a conical wall 27 leading to the end orifice 28 which receives the part to be rotated.

The front end of the hollow head 20 is threaded at its inner and outer surfaces. An inner sheath collar 30 is threadedly engaged inside the head, and has clearance for rotation of the spindle 24 within it and, when tightly secured in place, abuts against the exposed face of the outer race of bearing 21 for locking the outer races of bearings 21, 22 and serving for accurately locating the spindle and therewith the pulley 19 in the fixed position; preferably the adjacent faces of one or both outer races of the bearings 21, 22 are spaced during initial assembly, by having the corresponding inner race project farther from the plane of the antifriction balls of such race, and the sheath collar 30 is effective during its final tightening against the outer race of bearing 21 to effect an axial pre-loading upon the bearings, thereby reducing noise and end looseness of the spindle 24: the initial spacing may be small so that the outer races are brought together, as shown, by the endwise pressure of the collar 30, and therewith the pre-loading is controlled by the manufactured dimensions and can be reproduced by the dentist during reassembly, by engaging a key wrench in the slots 30a and rotating the collar 30 until it sets "solid." The inner sheath collar 30 is fixedly joined to a hollow inner sheath 31 which surrounds and is spaced from the spindle 24 and extends forwardly. At the front, the inner sheath 31 has an enlarged bore which ends at a shoulder 33 and is threaded for a part of its length from the open end. An inner retainer sleeve 32, with projections 32a for a wrench, is threaded into the enlarged bore of the inner sheath, with internal clearance for the rotation of the spindle 24, and when tightly threaded into place abuts against the exposed face of the outer race of an antifriction bearing 35. The small front ball bearing assemblies 34, 35 are accurately received in the enlarged bore, with the assembly 34 engaging the shoulder 33, and held together and in place by the stated action of the retainer sleeve 32: their inner races are in accurate sliding relation to the parts of the spindle 24 within them. The inner sheath 31 with its bearing support for the rotating parts, illustratively the bearings 34, 35 and the retainer sleeve 32, provide an inner sheath structure which can be pre-assembled and thereafter handled as a unit. Lubricant can be stored within the inner sheath 31 for supplying adequate lubrication to the bearings 21, 22, 34, 35 for an extended period of time.

An outer sheath 37 has peripheral milled-edge ribs for secure grasping by the operator. An out-turned flange 38 at the rear end abuts against the inner sheath collar 30. A clamp ring 36 is threaded on the exterior of the hollow head 20, and has a shoulder for pressing a spring friction washer 39 against the flange 38 for providing friction between the parts when assembled and thereby providing frictionally controlled relative rotation. When assembled, the flange 38 bears against the end surface of the inner sheath collar 30, and thereby determines the frictional action of the spring washer 39. At the front end, the outer sheath 37 has a reduced bore for receiving the reduced rear end of a conical nosepiece 40 having a shoulder 41 for abutment against the end of the outer sheath 37: after the nosepiece 40 has been inserted, its inner end can be spun outward to provide a flange 42 tightly engaging the shoulder at the rear end of the reduced bore, to provide a strong and permanent connection. The front end of the nosepiece has a concentric orifice 43 for receiving the bur shank or other part to be rotated. The outer sheath 37 with its nosepiece 40 provides an outer structure which can be pre-assembled and handled as a unit.

A chuck rod 45 extends within the spindle 24 and is threaded along the rear part of its length so that by rotation it is caused to travel axially within the chuck rod collet 26: a chuck rod head 46 has an internal thread for receiving the threaded rear end of the chuck rod 45; this rod being riveted over for tightly engaging and holding the chuck rod head 46. A chuck rod collar 47 is fixedly mounted near the forward end of the chuck rod 45, as by force-fitting over a knurled portion of the rod, and is accurately fitted in the central bore of the spindle 24 whereby whipping of the chuck rod 45 at high speeds is resisted. A split chuck 54 closely fits within the front end of the spindle 24 and has a conical surface for engaging the conical wall 27 in the spindle. The split chuck 54 is illustrated as having identical ends, each with slits 54a or 54b for resilient opening, and a thrust piece 48 is disposed between the front end of the chuck rod 45 and the split chuck 54, being provided at its front end with an internal conical surface for receiving the corresponding surface at the rear of the chuck piece. The four slits 54a at one end of the chuck 54 are spaced at 90 degrees from one another, and staggered relative to the four slits 54b at the other end, that is, a slit 54a is spaced by 45 degrees from each of the adjacent slits 54b: and the slits 54a overlap the slits 54b (Fig. 5) with each extending past the mid-length of the chuck 54, so that a highly flexible chuck piece is provided capable of firmly clamping a bur shank, the shaft of a contra-angle handpiece, etc.

In service, the chuck rod head 46 is rotated, whereby the chuck rod 45 is withdrawn, and the thrust piece 48 is thus released along with the split chuck 54, and the outward resilient forces at the split ends of the split chuck 54 release the pieces, including the rotative tool part if present, so that the part can be removed. When the shank of a bur or like tool is inserted through the orifices 43 and 28 at the front ends of the nosepiece 40 and spindle 24, it passes through the loosened chuck 54 and is guided to contact with the stop 48a provided by a wall in the front end of the thrust piece 48; and when the shaft of an angle type handpiece or the like is inserted through these orifices 43 and 28, it likewise enters the loosened chuck 54 while the outer sleeve of the angle type handpiece slides over the nosepiece 40 and becomes seated thereon, with a longitudinal notch or groove extending past the projection 40a on the nosepiece so that axial rotation of the angle type handpiece sleeve relative to the assembly of the nosepiece 40 and the outer sheath 34, is prevented, and the sheath 34 and the outer sleeve of the angle handpiece act in the dentist's hand as a rigid structure. Rotation of the chuck rod head 46, while the pulley 19 is held stationary, causes the rod 45 to move forward within the spindle, therewith forcing the thrust piece 48 forward and causing the split front end of the split chuck 54 to grasp the bur shank or angle piece shaft as the front conical surfaces cooperate. The detaining action is assisted by the inward springing of the split rear end of the chuck 54 engaged with the conical part of the thrust piece 48, so that a gripping action also occurs at the rear end of the bur shank or angle piece shaft.

It will be noted that the parts are symmetrical about the common axis of the handpiece, that adequate support is afforded to the spindle 24 and chuck rod 45 against whipping, that antifriction supports against axial forces are provided at widely spaced points along the spindle 24, and that large antifriction supports are provided against end thrusts at bearing races which are tightly clamped against axial looseness.

When employed with an angle type handpiece or other extension, the rotative shaft thereof enters the opening and seats in the split chuck 54 while the sleeve of the extension is received on the outer surface of the slightly conical nosepiece 40, noting that such extension sleeve can be slit to assure resilient fitting. Upon tightening the chuck rod head 46, the shaft of the extension is gripped and the parts are held against accidental separation, but with permissive common rotation of the extension and the sheath about the common axis under control by the friction washer 39.

The structure can be easily disassembled for cleaning and sterilizing of the outer sheath 37, by releasing the clamping ring 36, and slipping the sheath 37 with its nosepiece 40 from the inner sheath 31 which need not be disturbed. The outer surfaces at the front end of the spindle 24 are thereby exposed: and the internal parts, including the chuck 54 and the thrust piece 48, can be made accessible for removal by unscrewing the shuck rod collet 26 with the chuck rod 45 still therein. The parts can be separated by employing a push rod for engaging the chuck 54 and forcing it and the thrust rod 48 rearwardly and out. In case the spidle 24 has become fouled and requires cleaning or sterilization, the inner sheath 31 can be removed by unscrewing the collar 30 and slipping the inner sheath 31 away with its retainer 32 and the bearings 34, 35, thereby exposing the spindle 24 which can be slid forward when the collet 26 has released the pulley 19 and the spindle 24. By the employment of the sub-assemblies, the operations are simple, and it is likewise a simple matter to re-assemble the parts in proper order, noting that no specific degree of tightening is necessary for accurate and smooth running of the assembly.

The illustrative form is not restrictive, and the invention may be practiced in other ways within the scope of the appended claims.

What is claimed is:

1. In an apparatus of the class described, a hollow body having an apertured end wall, a spindle extending through said end wall, an antifriction bearing located within the body and including inner and outer race means, the outer race means abutting said end wall, a fixed collar on the spindle engaging a front face of the inner race means, externally accessible means on the spindle for engaging a rear face of the inner race means and thereby cooperative with said collar for clamping the antifriction devices upon the spindle, an inner sheath structure connected to said hollow head and extending forwardly therefrom along a part of the length of the spindle, a bearing at the front end of the inner sheath for supporting the spindle, an outer structure surrounding the inner sheath structure and extending therebeyond for providing a stationary nose for the handpiece, and removable means for pressing the outer structure against said hollow head.

2. An apparatus as in claim 1, in which the outer structure includes an outer sheath with a reduced bore at its front end, a nosepiece fitting within said bore and having a shoulder for engaging the front end of the outer sheath, said nosepiece having a flange for engaging a shoulder at the inner end of said reduced bore.

3. An apparatus as in claim 1, in which the inner sheath structure has an enlarged bore at its front end, and the bearing at the front end of said inner sheath is of antifriction type and includes outer race means tightly fitting said enlarged bore and abutting a shoulder at the inner end of said enlarged bore.

4. An apparatus as in claim 3, including a retainer secured within the inner sheath structure in engagement with the outer race means of the front antifriction bearing for maintaining the said bearing against said shoulder.

5. An apparatus as in claim 1, in which the inner sheath structure has a forward end surface at the hollow head, and the outer structure has an outturned flange for engaging said forward end surface, and in which said outer sheath securing means includes a threaded collar engaged with the hollow head and a rearwardly directed wall opposite said flange, and a friction washer is present between said flange and the threaded collar.

6. In an apparatus of the class described, a hollow body having an apertured end wall, a spindle extending through the end wall, a pair of antifriction ball bearings fitted within the hollow body having inner races fitting the spindle, the rearward said bearing having the rear face of its outer race abutting the said end wall and the outer races of said bearings being spaced when free of relative axial pressure, a collar fixed on the spindle and abutting the front face of the inner race of the front said bearing, externally accessible means on the spindle for engaging the rear face of the inner race of the rear said bearing for clamping the bearings in cooperation with the collar, and means threadedly engaged in said hollow body for pressing against the front face of the said front outer race and acting through said front outer race upon the rear outer race for holding the said rear outer race against said end wall with a predetermined axial preloading of said bearings.

References Cited in the file of this patent

UNITED STATES PATENTS

| | | |
|---|---|---|
| 1,922,644 | Terry | Aug. 15, 1933 |
| 2,538,923 | Staunt | Jan. 23, 1951 |